United States Patent
Pitsos (10) Patent No.: US 7,051,204 B2
(45) Date of Patent: May 23, 2006

(54) METHODS AND SYSTEM FOR PROVIDING A PUBLIC KEY FINGERPRINT LIST IN A PK SYSTEM

(76) Inventor: Errikos Pitsos, Harthauserstrasse 70, Munich 81545 (DE)

(\*) Notice: Subject to any disclaimer, the term of this patent is extended or adjusted under 35 U.S.C. 154(b) by 166 days.

(21) Appl. No.: 10/278,023

(22) Filed: Oct. 23, 2002

(65) Prior Publication Data

US 2004/0054889 A1    Mar. 18, 2004

(30) Foreign Application Priority Data

Sep. 17, 2002    (EP) ............... 02 020 583

(51) Int. Cl.
*H04L 9/00*    (2006.01)

(52) U.S. Cl. .............. 713/168; 713/176; 380/277; 380/282

(58) Field of Classification Search .......... 713/150, 713/156, 155, 189, 176, 200, 201, 157, 168; 380/277, 278, 279, 285, 282; 705/50, 51
See application file for complete search history.

(56) References Cited

U.S. PATENT DOCUMENTS

| | | | |
|---|---|---|---|
| 4,868,877 A | 9/1989 | Fischer | |
| 5,005,200 A | 4/1991 | Fischer | |
| 5,050,212 A | 9/1991 | Dyson | |
| 5,214,702 A | 5/1993 | Fischer | |
| 5,530,757 A | 6/1996 | Krawczyk | |
| 5,625,693 A | 4/1997 | Rohatgi et al. | |
| 6,058,383 A | 5/2000 | Narasimhalu et al. | |
| 6,144,739 A | 11/2000 | Witt et al. | |
| 6,304,974 B1 * | 10/2001 | Samar | 713/201 |
| 6,370,249 B1 * | 4/2002 | Van Oorschot | 380/277 |
| 6,694,434 B1 | 2/2004 | McGee et al. | |
| 6,802,002 B1 * | 10/2004 | Corella | 713/175 |
| 2001/0032310 A1 | 10/2001 | Corella | |

(Continued)

FOREIGN PATENT DOCUMENTS

EP    1 117 206 A2    7/2001

OTHER PUBLICATIONS

Michael T. Goodrich, et al.; "Implementation of an Authenticated Dictionary with Skip Lists and Commutative Hashing"; DISCEX 01; Proceedings of the DARPA Information Survivability Conference & Exposition II; vol. 2; pp. 68-82; Jun. 2001.

(Continued)

*Primary Examiner*—Hosuk Song
*Assistant Examiner*—Beemnet W Dada
(74) *Attorney, Agent, or Firm*—Nixon Peabody LLP (57) ABSTRACT

In a server of a public key system a list of fingerprints of public keys is stored and provided. Furthermore, a fingerprint of the fingerprint list is calculated for providing the calculated fingerprint of the list of fingerprints. A client terminal of the public key system receives a list of fingerprints of public keys and a first fingerprint thereof from a first source. The client terminal further receives a second fingerprint of the list of fingerprints from a second source and compares the first and the second received fingerprint.

1 Claim, 7 Drawing Sheets

U.S. PATENT DOCUMENTS

| | | |
|---|---|---|
| 2002/0073310 A1 | 6/2002 | Benantar |
| 2002/0112163 A1 | 8/2002 | Ireton |
| 2002/0194484 A1* | 12/2002 | Bolosky et al. ............. 713/189 |
| 2003/0018878 A1 | 1/2003 | Dorward et al. |
| 2003/0028777 A1 | 2/2003 | Hennessey et al. |
| 2003/0056093 A1* | 3/2003 | Huitema et al. ............ 713/156 |
| 2003/0097558 A1 | 5/2003 | England et al. |
| 2003/0097578 A1 | 5/2003 | England et al. |
| 2003/0097579 A1 | 5/2003 | England et al. |

OTHER PUBLICATIONS

European Search Report for EP Application No. 02 02 0583 dated Mar. 28, 2003.

* cited by examiner

| email address | hash value |
|---|---|
| fn 1. ln 1 @ a.com | H ( PK 1) |
| n 2 @ 2. de | H ( PK 2) |
| n 3 @ aol.com | H ( PK 3) |
| n 4 @ web.de | H ( PK 4) |
| HVL @ ca2.org | H ( HVL of CA2) |

*Fig. 3*

| user ID | public key | certificate |
| --- | --- | --- |
| 1 | PK 1 | CA 1_cert (PK 1) |
| 2 | PK 2 | CA 2_cert (PK 2) |
| 3 | PK 3 | CA 1_cert (PK 3) |
| 4 | PK 4 | CA 1_cert (PK 4) |
| CA 2 | PK- CA 2 | CA 1_cert (PK_CA 2) |

Fig. 7

# METHODS AND SYSTEM FOR PROVIDING A PUBLIC KEY FINGERPRINT LIST IN A PK SYSTEM

BACKGROUND OF THE INVENTION

1. Field of the Invention

The present invention is related to systems having a public key infrastructure (PKI) and particularly to a public key authentication process and means to support same.

2. Description of the Related Art

In modern Internet communication security is often based on public keys. These public keys are part of a public/private key pair of some user or entity. The public part is public available but the private part is only known by the given user or entity. Anybody can send data to this user or entity using encryption with that public key, but only the user or entity itself can decipher the data using its private key.

A given sender of such data has to make sure that the public key really belongs to the user or entity he wants to send the data to. To ensure this, there are various sorts of certification authorities that sign public keys with their private key. With that signature they proclaim authenticity of some information in the key, like the name and address. As the public key of this certification authority might be well known, any sender can verify the signature on the public key and by that make sure the public key really belongs to the user or entity he wants to send data to.

For signing data a hash value of the data is calculated in order to subsequently sign only the hash value of the data. By applying a hash algorithm to any given data a single unique hash value is achieved, which is much shorter than the data itself. However, it is nearly impossible to create data matching a given hash value.

The security of this system is based on 4 factors: the privacy of the certification authorities private key, the authenticity of the certification authorities public key that is available to the sender, the verification process the certification authorities use to ensure authenticity of the information they sign in public keys and the unique identification value of the signed information.

If a private key of such an certification authority is known to some potential attacker he can sign faked public keys he generated and by that draw senders to use this certificate when sending data. He can then decipher the sent data with the private part of the faked key. This is as well true for a potential attacker that is a part of the certification authority itself or that can apply force to the certification authority to sign such a key.

If a potential attacker can fake the public key of the certification authority to some sender, with its own faked public key, he can once again issue faked public keys by signing them with the private part of the faked certification authority key.

If the certification authorities process of verifying the information signed has vulnerabilities, a potential attacker can use these vulnerabilities to get the certification authority to sign faked keys.

If the information signed by the certification authority does not provide a reliable level of unique information, like two persons called "Peter Miller" in the same building, anybody in the range covered by such ambiguous information can apply means to read data originally intended for somebody else.

SUMMARY OF THE INVENTION

It is the object of the present invention to provide a PKI method and system which is improved in regard to the authentication of public keys.

This object is achieved by the subject matters of the independent claims. Preferred embodiments of the invention are described in the dependent claims.

The invention uses a fingerprint list to ensure authenticity of keys, wherein a fingerprint is a mathematically unique hash or digest of the public key. The fingerprint of a public key, optionally signed by the certification authority, is added to a list of fingerprints maintained by a hash value server or certification authority. Preferably, in a given time interval, like daily or weekly, the certification authority generates a fingerprint or hash value of the list itself. The generated fingerprint is published or made available by one or several means to all users of the system. Further the fingerprint list itself is somehow made available to all users.

A given sender can now get hold of the published fingerprint list and ensure the authenticity of this list by comparing the fingerprint of the list with this fingerprint published somewhere else.

BRIEF DESCRIPTION OF THE DRAWINGS

In the following the invention is described with reference to the figures illustrating.

DETAILED DESCRIPTION OF THE PREFERRED EMBODIMENTS

In the following, the invention is described with respect to hash values used as fingerprints for the respective public keys.

Figure 1:
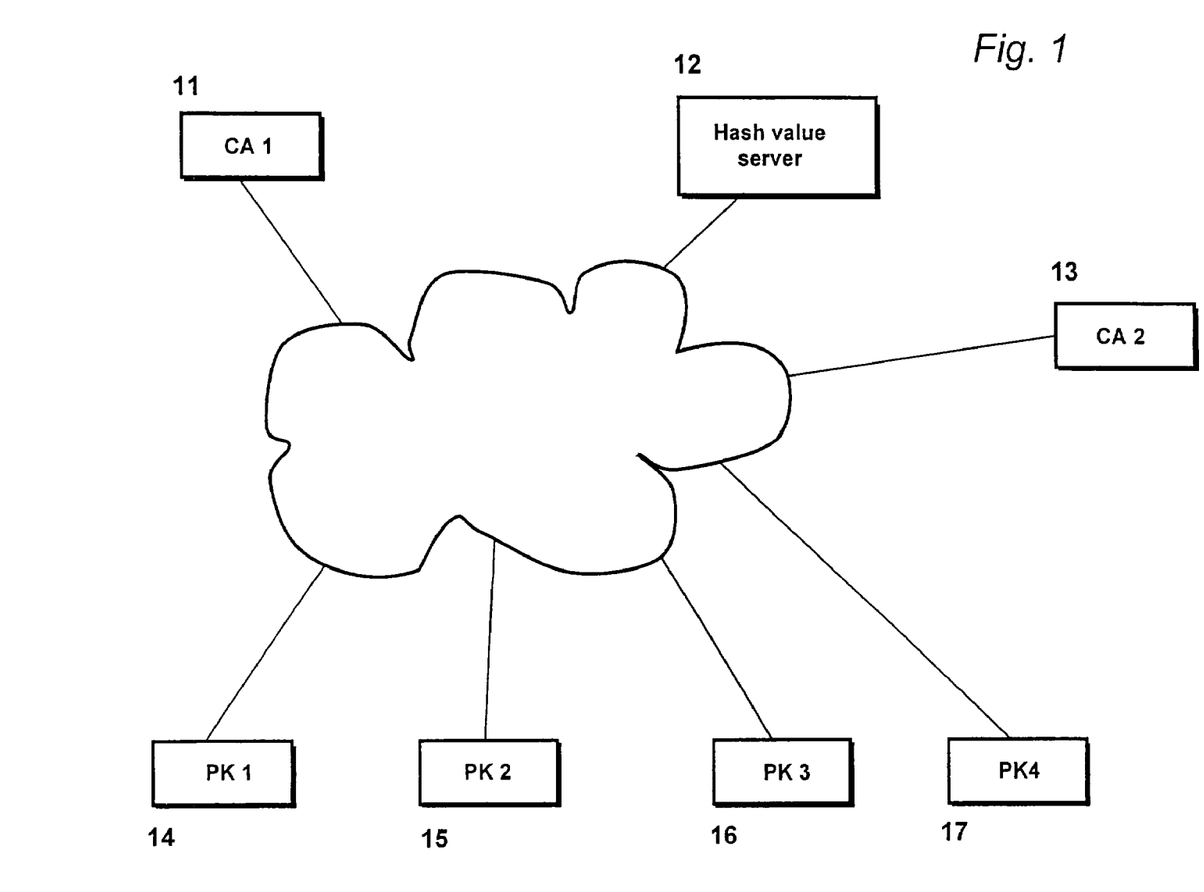
FIG. 1 a public key infrastructure system.

The public key system illustrated in FIG. 1 comprises first and second certification authority servers 11 and 13, a hash value server 12 as well as client terminals 14 to 17. The servers 11 to 13 and the clients 14 to 17 are connected to a public network such as the internet. An associated public key PK1 to PK4 exists for each of the client terminals 14 to 17 or the corresponding users of the client terminals 14 to 17.

A direct connection, preferably between each of the servers 11 to 13, which is not illustrated in FIG. 1, may provide a more secure communication path than the internet if required.

Upon request of the owner of the public key PK1, the first certification authority (CA1) 11 issues a certificate for the public key PK1 of the client terminal 14. This certificate cert_CA1 (PK1) is commonly presented to the further client terminals 15 to 17, when the client terminal 14 wants to receive data encrypted with PK1 from these terminals. Such a step of authentication of the public key PK1 however supposes the CA1 to be a trusted third party and secondly requires to authenticate the PK of CA1 by means of a certificate chain to a root CA.

The hash value server 12 stores a list of hash values for public keys preferably signed by at least one of the certification authorities 11 or 13. A hash value of the public key PK1 is stored in the hash value list of the hash value server 12. As described in more detail below with reference to FIG. 5, the hash value server 12 calculates a hash value for the stored list of hash values and provides the calculated hash value and the list of hash values. In the following, the hash value of the list of hash values is also referred to as a meta hash value.

The information stored in the hash value server 12 may be provided for public access or at least accessible for dedicated client terminals of the system. In particular, providing the information also includes to forward same either upon request or automatically to a list of predefined client terminals.

The client terminal 15 receives the list of hash values and the hash value thereof from the hash value server 12. Based on the received meta hash value, the client terminal 15 performs an authentication or verification process for the public key PK1 of the client terminal 14 before using the public key PK1 for verifying, authenticating or encrypting data. Moreover, the client terminal 15 may as well check the authenticity of its own public key PK2 included in the list of hash values. A corresponding process in a client terminal is described in more detail below with reference to FIGS. 6 and 7.

The hash value server 12 of FIG. 1 may as well be implemented as a part of the certification authority servers 11 and 13 or by means of a peer to peer system of the client terminals. The used hash algorithms may for example be SHA1 or MD5.

Figure 2:
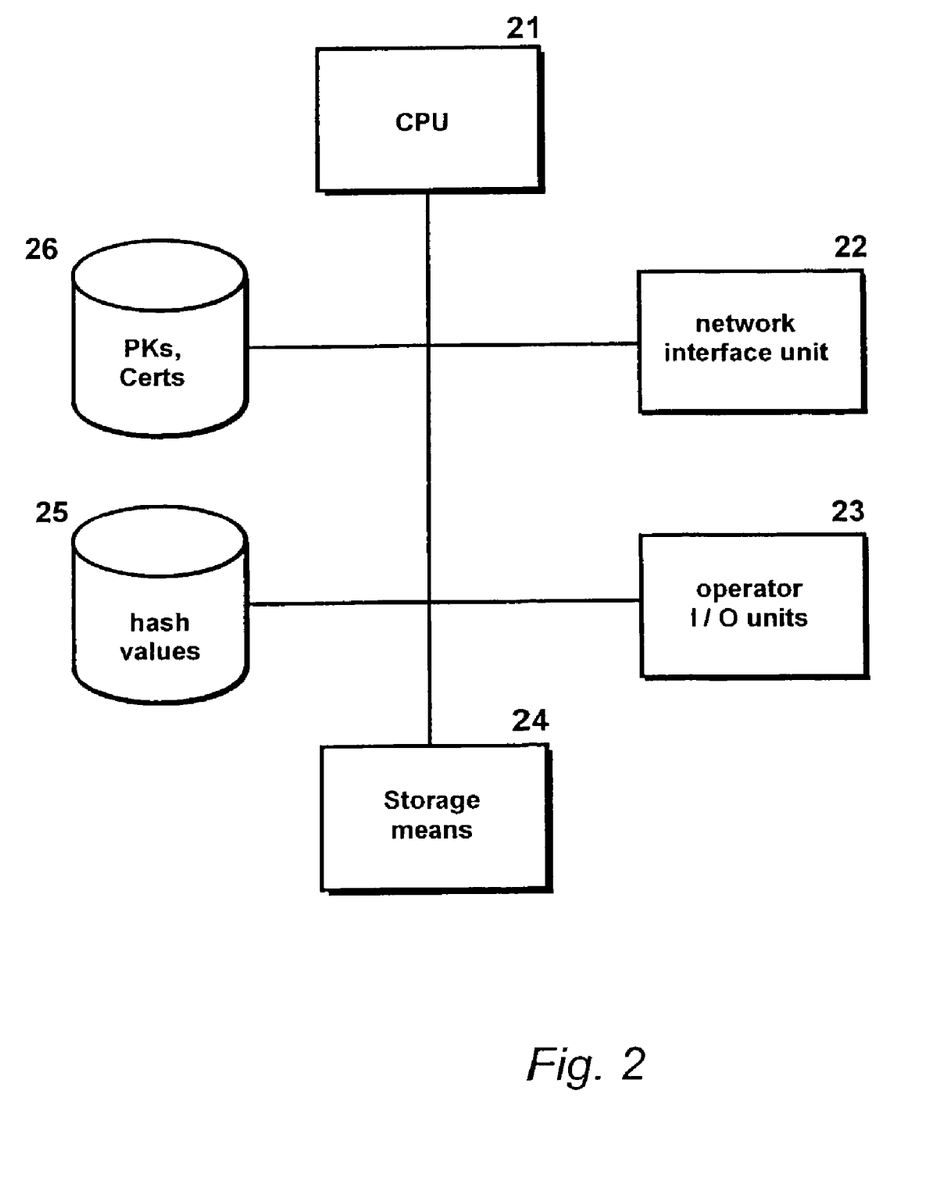
FIG. 2 functional units of a hash value server or certification authority server.

FIG. 2 illustrates functional units of the hash value server of FIG. 1.

The hash value server comprises a CPU21, a network interface unit 22, connected to the internet, operator I/O units 23 for interacting with an operator, storage means 24, as well as further storage means 25, 26.

The operator I/O units 23 particularly comprise monitor, mouse and keyboard. Furthermore, the network interface unit 22 allows the server to receive requests for information from the client terminals, to transmit the stored information or to receive input information. Input information may for example be received from the certification authority servers for further public keys to be added to the list of hash values. Particularly in this regard, a not illustrated direct interface unit may provide a secure direct connection to at least one of the CA servers.

The storage means 24 may be formed by RAM, EEPROM, ROM, a hard disk, a magnetical disk drive and/or an optical disk drive. An operative system of the server as well as application software to perform the required operations is stored in storage means 24.

In this example, the further storage means 25, 26 are formed by a first storage unit 25 for storing hash values and a second storage unit 26 for storing public keys as well as certificates thereof. The storage unit 25 holds a list of hash values for public keys as well as the meta hash value for the list of hash values. This storage unit 25 may further store a temporary list of received hash values separately stored from the list of hash values currently provided to the public.

Figure 3:
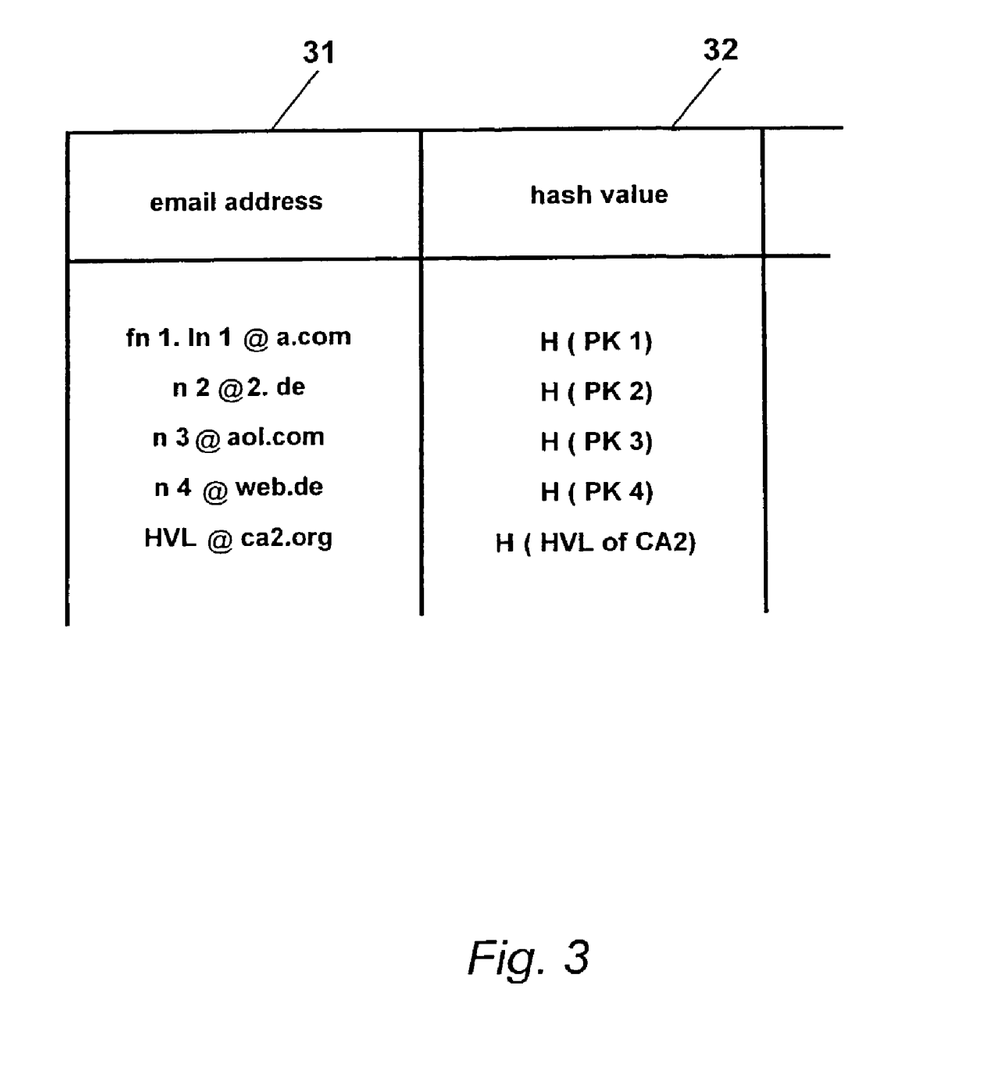
FIG. 3 a table storing a list of hash values together with unique identifiers.

FIG. 3 illustrates a list of hash values 32 as stored in the hash value server. A unique identifier associated to the public key and thus also associated to the hash value thereof is correspondingly stored in column 31. Unique identifiers are formed by e-mail addresses of the respective owners of the public keys PK1 to PK4. The list of hash values 32 further stores a meta hash value for a list of hash values of the certification authority CA2. The list may further comprise a hash value for the public key of the certification authority CA2.

Finally, a meta hash value is calculated for the list of hash values 32 or preferably for the list of hash values 32 and associated e-mail addresses 31.

Figure 4:
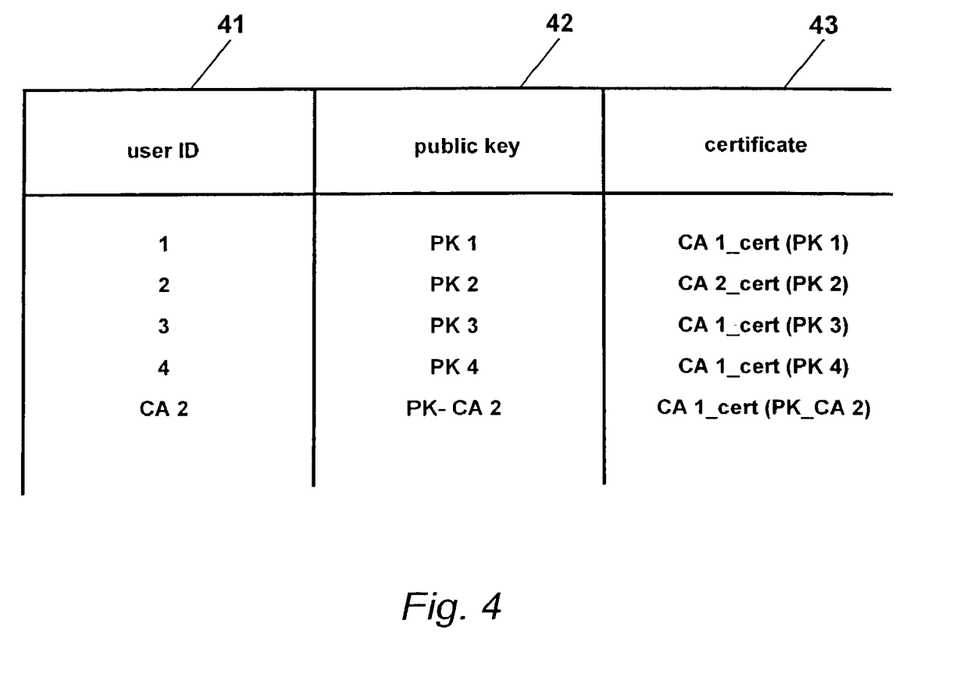
FIG. 4 table storing a list of public keys, associated user ID and certificates.

FIG. 4 illustrates data as they may be stored in the public key/certificate storage unit of FIG. 2.

Column 41 comprises a user ID as a unique identifier for a user. The user ID may for example replace or correspond to the e-mail addresses of FIG. 3 or may even be mapped thereto in a further reference table. Column 42 comprises a list of public keys for the users identified in column 41. Column 43 comprises a list of certificates for the associated public keys, the certificates being issued by one of the certification authorities CA1 or CA2. Each entry in the list 41–43 corresponds to one entry in the list of hash values of FIG. 3.

Besides public keys PK1 to PK4 of the users 1 to 4, the last item of the table in FIG. 4 comprises a public key PK_CA2 of the certification authority CA2. A corresponding certificate CA1_cert (PK_CA2) is issued by the certification authority CA1.

Furthermore, the tables illustrated in FIGS. 3 and 4 may additionally comprise non-illustrated data fields such as a revocation information, indicating if a hash value or a corresponding certificate has been revoked, or update information, indicating a date or time when the hash value has been updated.

Figure 5:
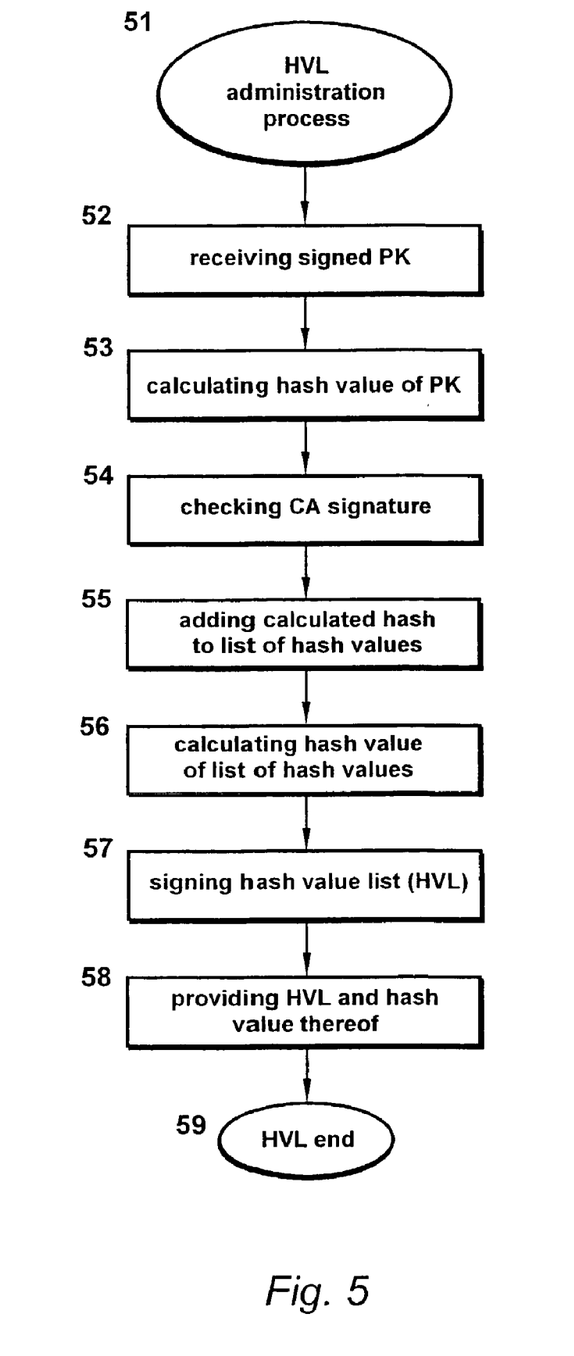
FIG. 5 a flowchart of an administration process for a hash value list.

A process of administering a list of hash values in a hash value server is now described with reference to FIG. 5.

Initially, in a step 52 a public key PK is received which may be signed by a certification authority CA. The signature of the CA for the PK may correspond to the certificate of the PK.

A hash value of the public is calculated in step 53.

Subsequently, the signature of the certification authority may be checked in the optional step 54, in order to verify that the public key is actually received from the certification authority. Such a step of verification is performed by applying the public key of the CA to the existing CA's signature of the PK. In case the signature cannot be verified, the process is terminated.

In step 55 the calculated hash value is added to a list of hash values, which is stored in the hash value server. For the supplemented list of hash values a meta hash value is calculated in step 56. The list of hash values may be signed by the hash value server in step 57. Finally, the hash value list, the meta hash value thereof and optionally the signature of the hash value list is provided in step 58.

The step of providing 58 may for example be implemented by storing the information in the hash value server and transmitting same upon request, forwarding the information to a list of predefined destinations or forwarding same to predefined publication means.

Preferably, in the step of adding 55 the calculated hash value is initially added to a temporary list of hash values stored separately from the list of hash values currently provided to the public. Furthermore, a time interval may be defined for performing the steps 56 to 58 for example daily, weekly or monthly only. Hence, new hash values received within the given time interval will be intermediately stored in the temporary list for being added to the published list after expiry of the time interval. Moreover, In order to inform about the relevance of the meta hash value, the time or date of the calculation of the meta hash value may be stored and provided together with the meta hash value.

Furthermore, a unique identifier such as the email address of the public key's owner may be either also received from the CA or assigned in the hash server in accordance with the requirements of the public key system.

Figure 6:
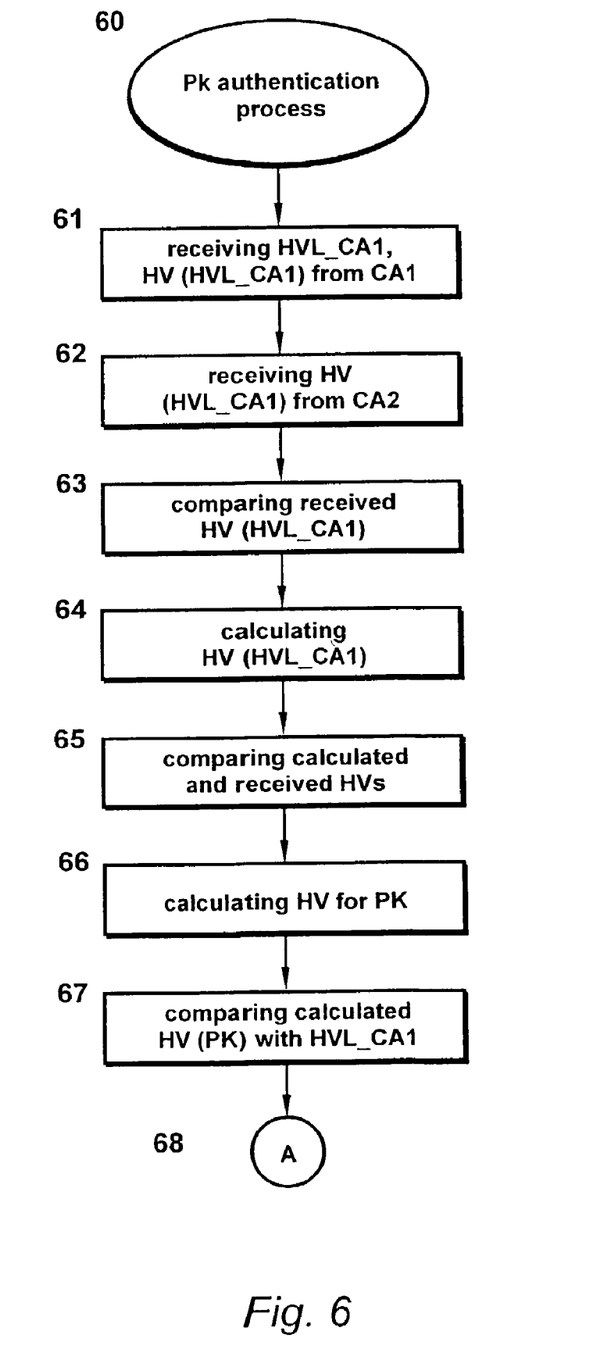
FIG. 6 a first part of a flowchart for a public key authentication process.
Figure 7:
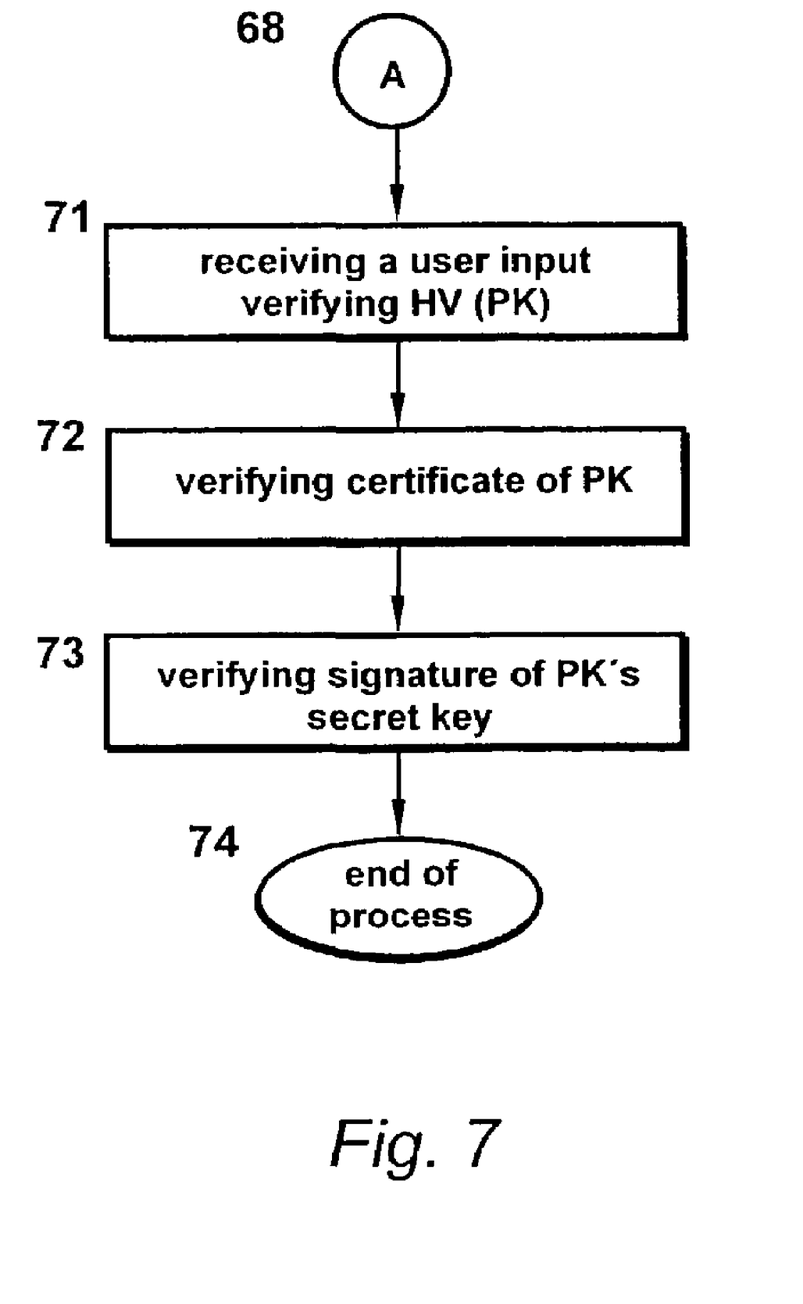
FIG. 7 a second part of the process of FIG. 6.

FIGS. 6 and 7 illustrate a public key authentication process as performed in a client terminal.

In the process 60 to 68 of FIG. 6, a hash value list and a meta hash value thereof are initially received in step 61 from a first hash value server. Thereafter, a second meta value for the hash value list of the hash value server is received in step 62 from a second hash value server. Finally, in a step 63 of comparing the received meta hash values, it is determined whether both meta hash values correspond to each other.

Furthermore, each of the steps 61 and 62 may additionally comprise a step of verifying a signature of the corresponding hash value server and/or a step of decrypting the received information, which is encrypted by means of a key for example derived from a mutual authentication process.

As it will become more apparent in the following, various sub processes, for example steps 64 and 65 or steps 66 and 67, may be optionally combined to the general steps 61 to 63 in order to modify a required degree of security in the authentication process for the public key.

The process 60 to 74 may be terminated, if in any step of comparing, verifying or authenticating indicates a possibly faked key which accordingly should not be used for subsequent communication. For example, if the comparison result of step 63 indicates deviating hash values, the list of hash values can not be considered as a trusted list. However, after such a single negative authentication result the process does not have to be terminated, but may as well be continued with an alternative or additional sub process for authenticating the public key in question. In particular, for example the steps of receiving and comparing 61 and 63 or 62 and 63 may be repeated upon using a difference source for the received data. It is again noted that a hash value server may as well be formed by a certification authority server or a peer to peer system of clients emulating same.

After the step of comparing 63, the meta hash value is calculated 64 within the client terminal based on the hash value list received from the hash value server. The calculated meta hash value is compared in step 65 with one of the received meta hash values.

Moreover, in step 66 a hash value is calculated for a specific public key PK. Based on the calculated hash value H(PK), a corresponding hash value stored in the received list of hash values can be verified by a comparison 67.

The process illustrated in FIG. 6 is continued with steps 71 to 74 of FIG. 7, comprising 3 further sub processes of the authentication process.

A step 71 of receiving a user input for verifying the hash value is provided, for cases which can not be handled automatically such as a hash value received by a user via e-mail. The step of receiving 71 may comprise requesting the user input, receiving same and evaluating correspondence to the calculated hash value of the public key. A similar process may be performed for the meta hash value of the list of hash values.

Furthermore, a certificate of the public key in question may be verified in step 72. Finally, in order to check whether the third party or alleged owner of the public key in fact holds a secret key associated to the public key, a signature of the secrete key, typically applied to random data provided by the client terminal, is verified in step 73.

Turning back to FIG. 1 now, hash value lists of different hash value servers 12 or certification authorities 11, 13 may as well be combined in a single list. Such combined list may be furthermore provided by a third party. Accordingly, a hash value server or a certification authority may be emulated by a distributed peer to peer system, for example formed by the client terminals 14 to 17.

The client terminals 14 to 17, when communicating with each other and using their respective public keys PK1 to PK4, may add hash values or parts of the hash value list to a message sent to another client terminal.

A fingerprint generally is a mathematically unique hash value or another type of digest for data such as a public key. Accordingly, any type of sufficiently reliable one-way function providing a unique non-reproducible value for data input to the function may be used as a fingerprint algorithm.

As apparent from the above described list of hash values for public keys, such fingerprints may further be calculated and used as fingerprint lists even for other relevant information such as software binary code or software source code. For example, to ensure authenticity of a software a hash value of the software code of the software is calculated and provided. For example, the software for encrypting the communication process with the previously authenticated public key or a new version or update of an existing software involved in the process may be authenticated or additionally approved by its hash value.

The certification authority or the hash value server limit their operation to only a single key for one unique information or identifier. Duplicate keys or identifier will be detected and disabled, e.g. deleted from the list, for the further processing.

A unique information could be an email address, a social security or another identification number. The hash value server or the certification authority makes sure that there is always only one valid public key according for this unique identifier. The single unique information will-enable the sender to really identify the owner of the public key. A single unique public key for a single unique information signed or underlying the whole system ensures that no double keys can undermine this system.

In the above described system, a given sender can try to find any public key's fingerprint in the fingerprint list and thereby ensure the authenticity of this public key as well. Any given user or entity that has its public key signed by the certification authority can verify its own public key just like the sender. As soon as he verifies his public key, he ensures that not even the certification authority itself could have faked the key.

Given the above procedures the security of the public key certificates is not bound to the security of the private key of the certification authority anymore. Not even the certification authority can fake keys.

While the invention has been described with respect to the preferred physical embodiments constructed in accordance therewith, it will be apparent to those skilled in the art that various modifications, variations and improvements of the present invention may be made in the light of the above teachings and within the preview of the appended claims without departing from the spirit and intended scope of the invention. In addition, those areas in which it is believed that those of ordinary skilled in the art are familiar, have not been described herein in order to not unnecessarily obscure the invention described herein. Accordingly, it is to be understood that the invention is not to be limited by the specific illustrative embodiments, but only in the scope of the appended claims.

What is claimed is:

1. A method for ensuring authenticity of keys to manage security in a public key system, the method comprising:

storing a public key;

performing a mathematical fingerprint of the public key;

adding the fingerprint of the public key to a list of fingerprints maintained by a certification authority to update the list of fingerprints;

performing a mathematical fingerprint of the updated list of fingerprints maintained by the certification authority;

publishing the fingerprint of the public key to a first user that accesses the system;

publishing the fingerprint of the updated list of fingerprints to a first user that accesses the system;

publishing the fingerprint of the public key to a second user that accesses the system;

publishing the fingerprint of the updated list of fingerprints to a second user that accesses the system;

receiving at a client terminal the fingerprint of the public key from a first user;

receiving at the client terminal the fingerprint of the updated list of fingerprints from a first user;

receiving at the client terminal the fingerprint of the updated list of fingerprints from a second user;

comparing at the client terminal the fingerprint of the updated list of fingerprints from the first user and the updated list of fingerprints from the second user to determine if the updated lists match; and providing the secure materials to the client terminal if the updated list of fingerprints from the first user and the updated list of fingerprints from the second user match.

* * * * *